United States Patent [19]

Lamel et al.

[11] 3,790,930

[45] Feb. 5, 1974

[54] TELEMETERING SYSTEM FOR OIL WELLS

[75] Inventors: Arthur E. Lamel, Arcadia; William D. Squire; Harper J. Whitehouse, both of San Diego, all of Calif.

[73] Assignee: American Petroscience Corporation, Bakersfield, Calif.

[22] Filed: Feb. 8, 1971

[21] Appl. No.: 113,147

[52] U.S. Cl...340/18 NC, 340/18 LD, 340/13.5 SW, 181/.5 AG, 175/40, 166/113
[51] Int. Cl.............................................. G01v 1/14
[58] Field of Search... 340/18 LD, 15.5 SW, 18 NC; 181/15 AG; 175/40, 50; 166/113

[56] References Cited
UNITED STATES PATENTS

| | | | |
|---|---|---|---|
| 2,161,256 | 6/1939 | Karcher | 73/151 |
| 3,520,375 | 7/1970 | Raynal et al. | 175/50 |
| 3,205,477 | 9/1965 | Kalbfell | 340/18 NC |
| 3,633,688 | 1/1972 | Bodine | 175/56 |
| 3,475,722 | 10/1969 | White | 340/15.5 SW |
| 2,658,578 | 11/1953 | Oliphant | 340/15.5 SW |
| 3,588,804 | 6/1971 | Fort | 340/18 LD |
| 3,252,225 | 5/1966 | Hixson | 340/18 NC |

OTHER PUBLICATIONS

Barnes et al., "Passbands for Acoustic . . . Drill String," pg. 1606–1608, S.A.S.A., Vol. 51, No. 5 (Part 2).
McSkimir, "Measurement of . . . Torsional Waves," 7/22/52, pg. 355–364, S.A.S.A., Vol. 24 No. 4.

*Primary Examiner*—Benjamin A. Borchelt
*Assistant Examiner*—N. Moskowitz
*Attorney, Agent, or Firm*—Forrest J. Lilly

[57] ABSTRACT

An acoustic communication method and system for transmitting information through a well bore drill string or other pipe by establishing in the pipe modulated torsional acoustic waves, preferably of zero order, which contain the information to be transmitted and travel from a signal transmitting station to a signal receiving station spaced along the pipe, and for demodulating the modulated waves arriving at the receiving station to recover the transmitted information. The modulated waves may be established in the pipe either by driving the pipe in torsional oscillation and modulating the resulting torsional waves in the pipe at the transmitting station or by launching modulated torsional waves through the pipe at the transmitting station. In its principal application, the invention is utilized to monitor selected well drilling parameters, such as temperature, formation pressure, formation porosity, drill string orientation, and/or to operate devices within the well bore. Primary advantages of the invention are reduced acoustic transmission losses from acoustic coupling to the drilling fluid and well bore wall and the ability to transmit information while drilling is in progress. According to the preferred practice of the invention, when monitoring drilling parameters, the torsional acoustic waves are launched downwardly through the drill string from the surface by exciting the upper end of the string in a zero order torsional acoustic oscillation at frequencies within the base band of the drill string acoustic transmission characteristics so as to minimize attenuation of the acoustic waves by the couplings between the drill string pipe sections. These torsional acoustic waves are modulated at a subsurface signal-transmitting station along the drill string and returned back through the string to a surface signal-receiving station where the modulated waves are demodulated to recover the transmitted information.

23 Claims, 25 Drawing Figures

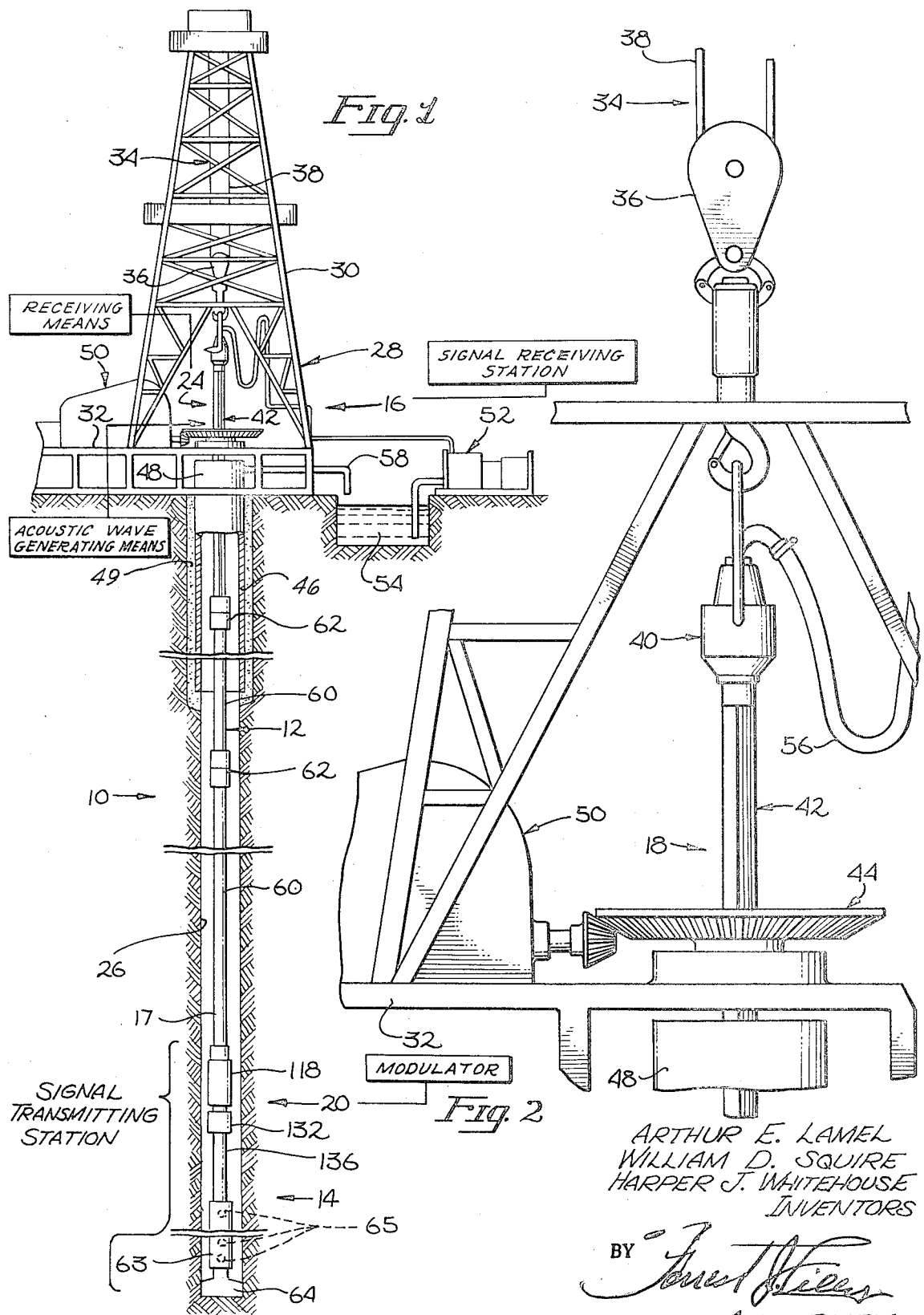

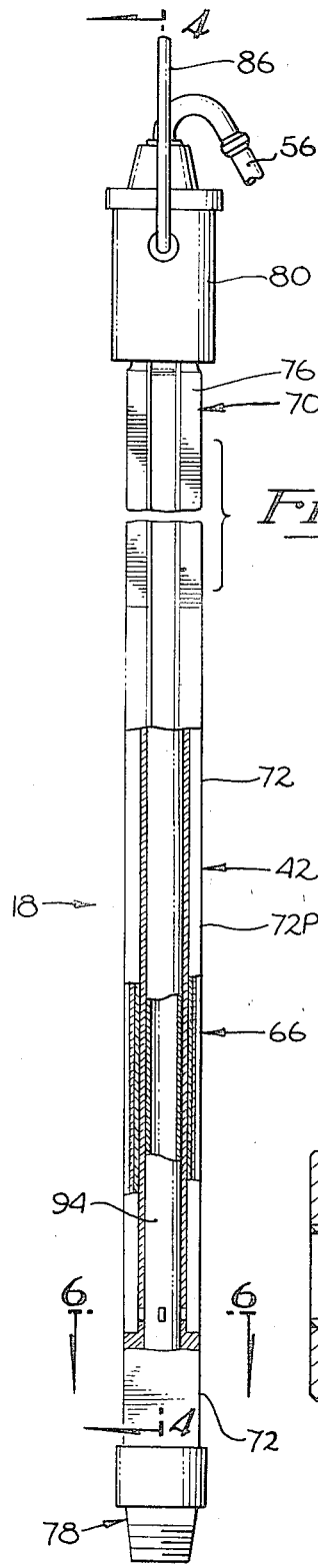
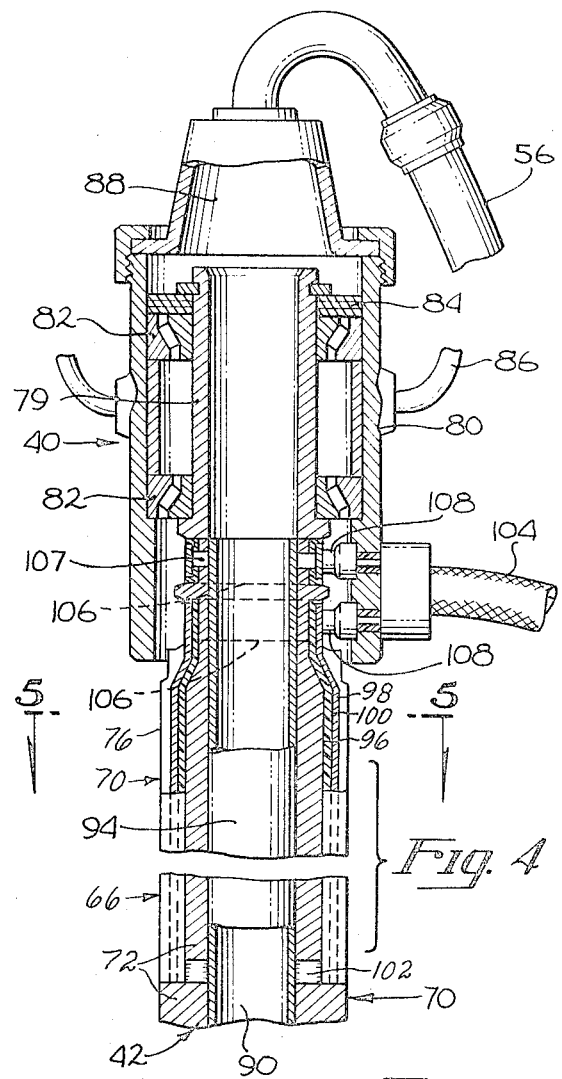
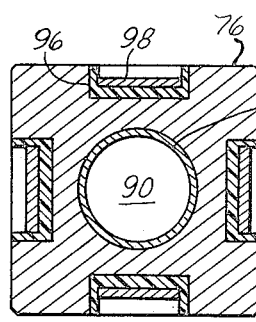
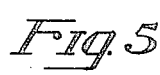

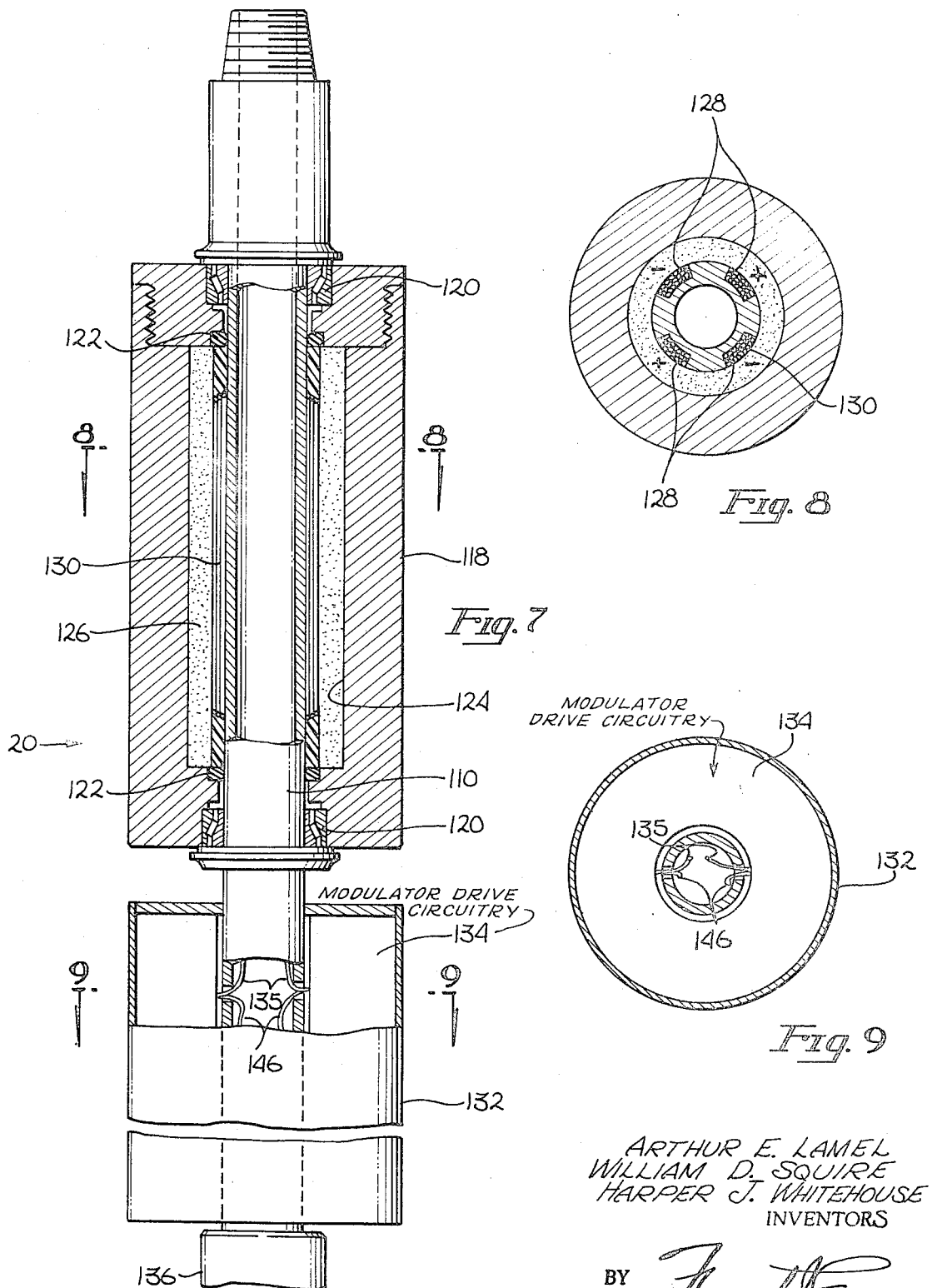

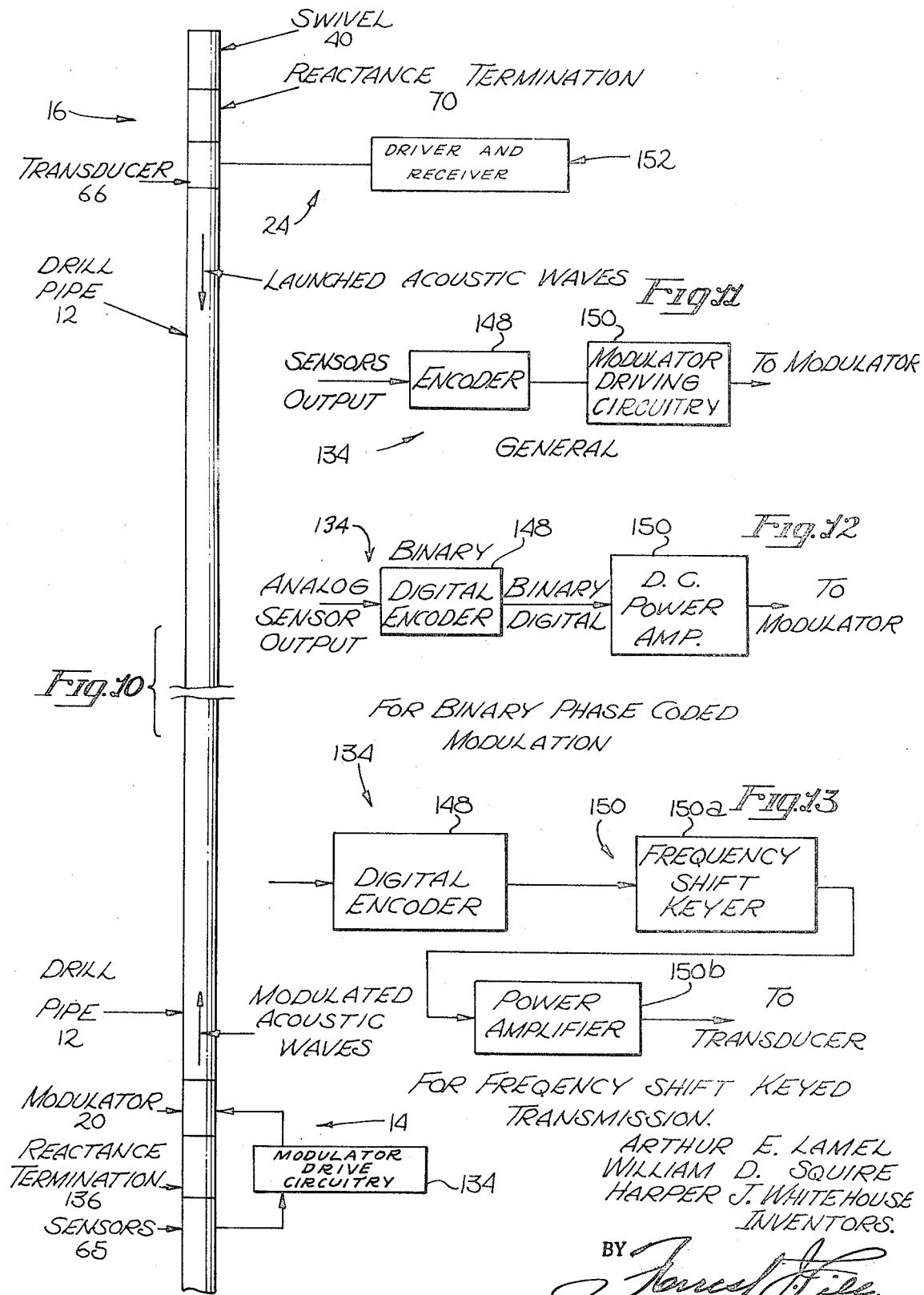

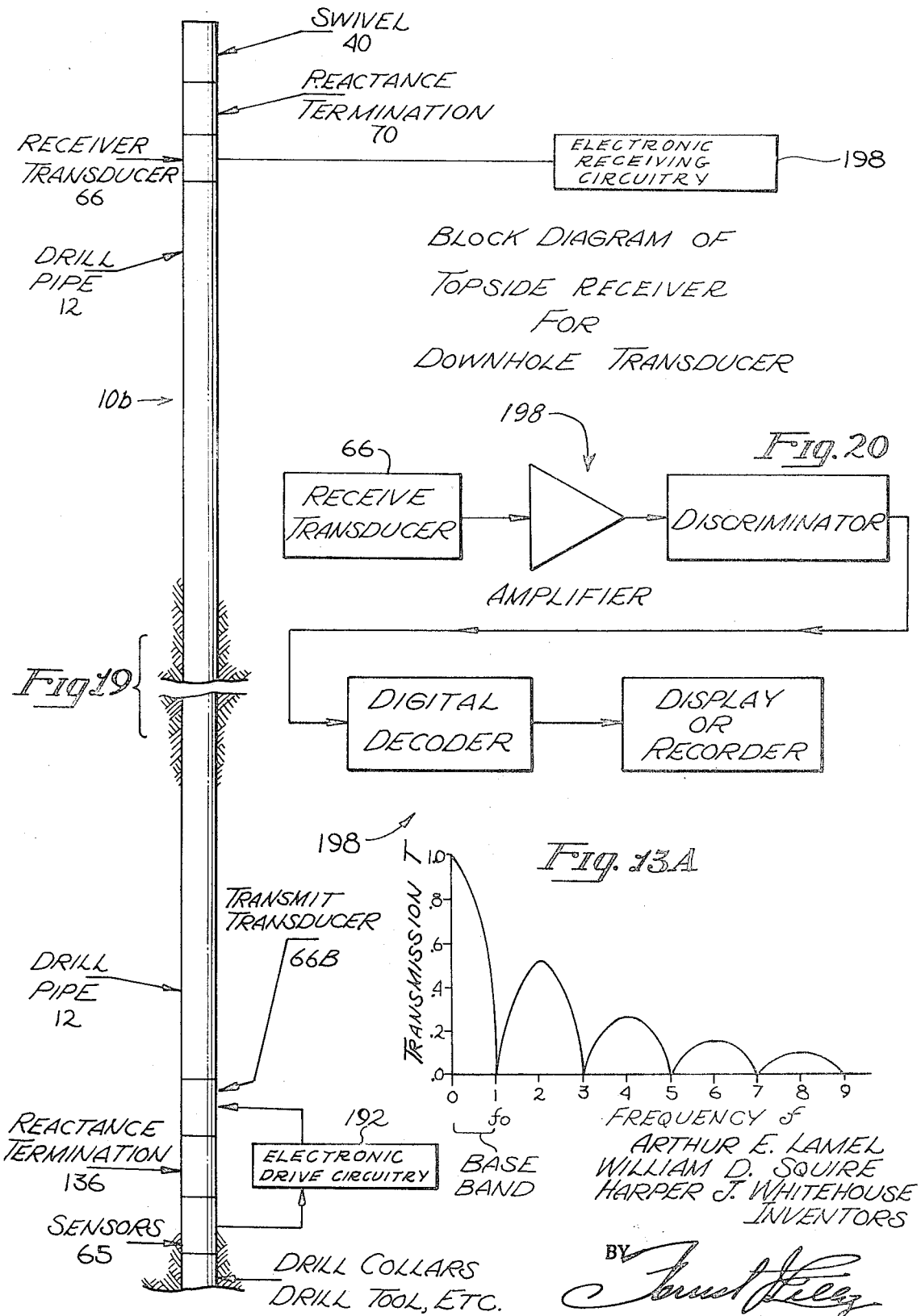

BLOCK DIAGRAM OF
TOPSIDE ELECTRONIC CIRCUITY
FOR DOWN-HOLE MODULATION AND RETURN
OF SIGNAL TRANSMITTED FROM TOPSIDE

ARTHUR E. LAMEL
WILLIAM D. SQUIRE
HARPER J. WHITEHOUSE
INVENTORS

BY
ATTORNEY

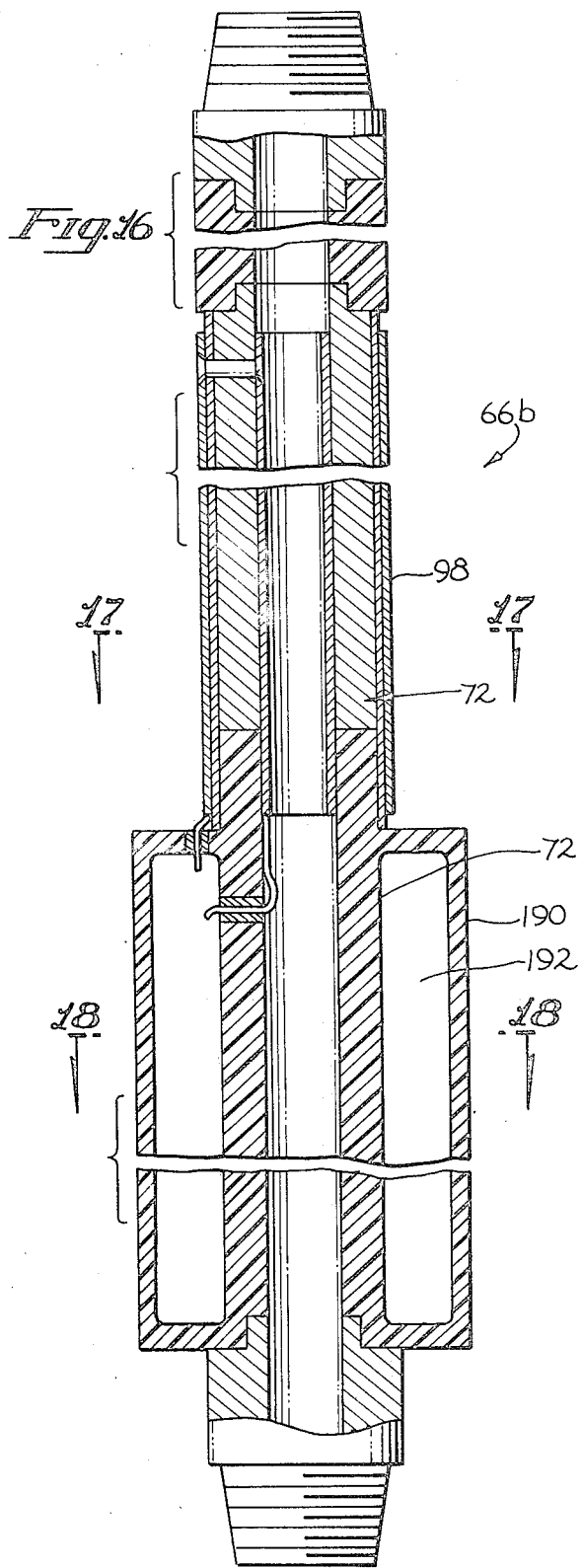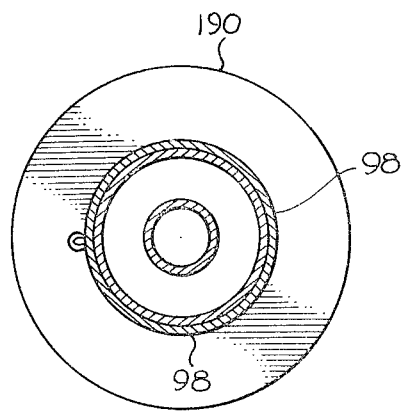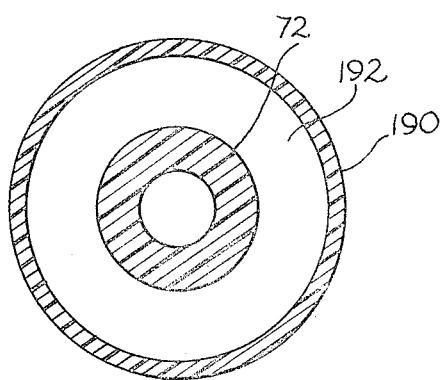

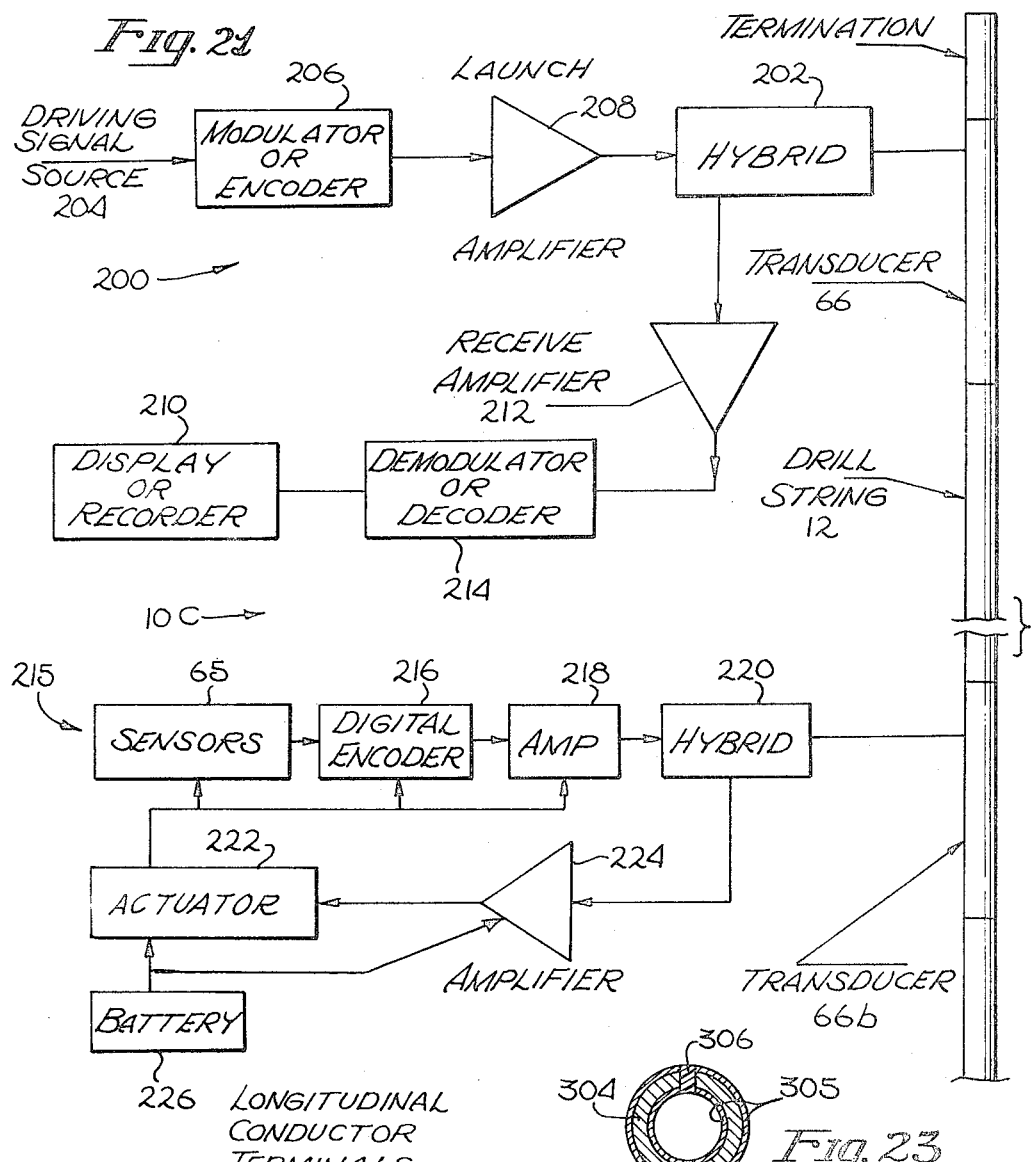
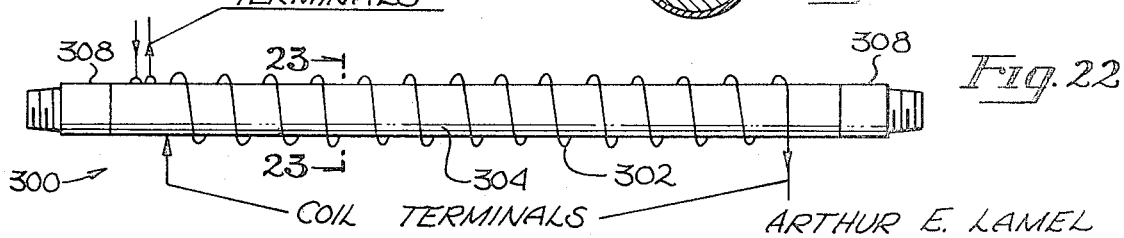
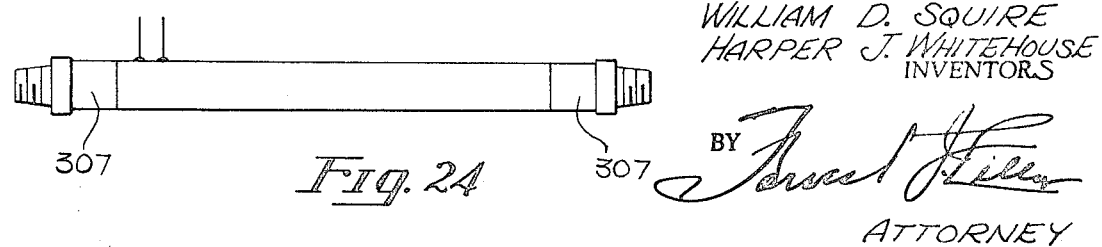

3,790,930

TELEMETERING SYSTEM FOR OIL WELLS

BACKGROUND OF THE INVENTION

Related Applications

This application is a parent of copending applications filed September 12, 1973, under Serial Nos. 396,400, 396,401, 396,403, and 396,411.

1. Field of the Invention

This invention relates generally to the art of transmitting telemetric and control information through a hollow well bore drill string or other pipe. More particularly, the invention relates to an improved acoustic communication method and system for the purpose described wherein the information carrier is provided by torsional acoustic waves preferably of zero order.

2. Description of the Prior Art

As will appear from the ensuing description, the present acoustic communication method and system may be employed to transmit information between two points of any pipe having an intervening length capable of sustaining torsional acoustic waves, particularly torsional waves of zero order. However, the principal application of the invention involves transmission of telemetric and control information through a hollow drill string suspended within a well bore. Accordingly, the invention will be disclosed in connection with this particular application.

When drilling a well bore, it is desirable, if not essential, to monitor selected drilling parameters in the vicinity of the drill bit for the purpose of providing the drilling operator with sufficient information to properly control the drilling operation. Among the drilling parameters which provide valuable information to the drilling operator are temperature, formation pressure, formation porosity, and others. In slant drilling operations, such as off-shore drilling of multiple wells from a single platform or island, an additional drilling parameter which provides extremely valuable, if not essential information to the drilling operator, is drill string orientation.

Such drill string orientation is expressed in terms of the azimuth and pitch or inclination of the lower end of the string and must be accurately measured at frequent intervals during the drilling operation in order to maintain the proper slant drilling direction.

At the present time the most widely used method of measuring drill string orientation involves the use of a well log which is lowered on a cable through the hollow drill string to the bottom of the well bore. This log contains instruments, such as a compass and a spirit level or pendulum, for sensing drill string azimuth and inclination and a camera for photographically recording the instrument readings. After actuation of the camera to record these instrument readings, the log is withdrawn from the drill string and the film is developed to obtain the readings. While this method provides accurate information concerning drill string orientation, it is extremely time-consuming and substantially increases the total drilling cost. Thus, each well logging operation involves cessation of drilling, uncoupling the drilling kelly from the drill string, lowering and subsequently raising the log the whole length of the drill string, recoupling the kelly to the drill string, and resumption of the drilling operation. In many off-shore drilling operations, periodic logging of the well bore in this fashion may account for up to one-half the total drilling time and hence for a large portion of the total drilling cost.

The present invention proposes to avoid the above and other disadvantages of the described well logging technique and to improve on the existing techniques for monitoring other drilling parameters by providing a novel acoustic communication method and system for transmitting telemetric and control information through a drill string. As will appear from the later description, such information transmission may occur while the drill string is stationary or rotating.

The prior art relating to well drilling is replete with a vast assortment of acoustic communication techniques for transmitting information through a drill string. Simply stated, such communication techniques involve propagation through the drill string from one position or station to another of modulated acoustic waves containing the information to be transmitted, and demodulation of the modulated waves at another position or station along the drill string to recover the transmitted information. In the present disclosure, the station from which the modulated acoustic waves propagate is referred to as a signal-transmitting station. The position at which the modulated waves are demodulated to recover the transmitted information is referred to as a signal-receiving station.

The prior acoustic communication systems for transmitting information through a drill string are deficient in that they utilize relatively inefficient modes of acoustic wave propagation and thus achieve, at best, only marginal information transmission. In this regard, it is significant to note that most published patents in the field use such descriptors as vibrations, sound, acoustic waves, and the like, to describe the acoustic information carrier, and do not specifically define the exact mode of acoustic wave propagation. Those patents which do describe a specific form of acoustic wave propagation utilize either longitudinal or flexural vibration modes. These latter vibration modes, however, are ill suited for use in transmitting information through a drill string owing to the large transmission losses which occur as a result of acoustic coupling of the drill string to the drilling fluid and the wall of the well bore.

Because of these large transmission losses, the patented drill string communication systems are at best capable of operation only in a manner wherein the acoustic waves are modulated and launched upwardly through the drill string from a signal-transmitting station at the lower end of the string to a signal receiving station at the surface. This manner of operation requires installation of the acoustic wave transducer and its electronic driving circuitry within the lower end of the drill string. Accordingly, the transducer and circuitry must be designed to fit the envelope of the drill string and to survive the hostile environment existing within the lower end of the well bore during drilling. In addition, servicing and replacement of the transducer and its circuitry requires removal of the entire drill string from, and subsequent lowering of the entire drill string into, the well bore.

SUMMARY OF THE INVENTION

The present invention provides an improved acoustic communication method and system of the class described whose primary application involves transmission of telemetric and control information through a drill string suspended within a well bore from a surface drilling platform. According to the invention, modulated acoustic waves containing the information to be transmitted are propagated through the drill string from the signal transmitting station to the signal receiving station, and the modulated waves arriving at the receiving station are demodulated to recover the transmitted information. It is significant to note here that the invention contemplates within its scope two different methods of establishing the modulated acoustic waves within the drill string. According to one method, acoustic waves are first established in the drill string and these waves are modulated at the signal transmitting station by exciting an acoustic wave modulator in the drill string with a modulating signal representing the information to be transmitted. According to the other method, modulated acoustic waves containing the information to be transmitted are generated in the drill string at the signal transmitting station by exciting an acoustic wave generator or transducer in the drill string with a driving signal which is modulated to represent the information to be transmitted. Accordingly, it will be understood that within the context of the present disclosure, terms such as "modulate," "modulation," cover both modulation of existing acoustic waves in the drill string and generation or launching of modulated acoustic waves into the drill string for the purpose of establishing in the drill string modulated acoustic waves containing the information to be transmitted.

Telemetric signals transmitted through the drill string may represent selected drilling parameters in the vicinity of the drill bit, such as temperature, formation pressure, formation porosity, drill string orientation, and others. In this case, modulation occurs at a subsurface signal-transmitting station adjacent the lower end of the drill string with telemetric signals from sensors responsive to the selected drilling parameters to be monitored. Control signals transmitted through the drill string may be utilized to operate, from a station on the drilling platform, devices within the well bore, such as signal transmitters located at sub-surface stations along the drill string.

One important aspect of the invention is concerned with the form of acoustic waves which are employed to transmit information. According to this aspect, the waves are torsional acoustic waves. Such torsional acoustic waves are superior to all other acoustic waves, such as longitudinal and flexural, for information transmission through a drill string in that they couple less acoustic energy into the drilling fluid and wall of the well bore and thus permit efficient signal transmission through a greater length of drill string. In its broader scope, the invention contemplates the use of any torsional acoustic waves which may be launched through a drill string and modulated to transmit information through the string. However, the preferred waves are torsional acoustic waves of zero order, that is, torsional acoustic waves characterized by pure rotation of the drill string about its central axis. Such zero order torsional waves are non-dispersive, i.e., the velocity of the waves is independent of their frequency, while most other acoustic wave forms are dispersive. Non-dispersive wave propagation through a drill string is highly desirable and often essential to rapid signal transmission through the string for the reason that dispersion smears the information signals modulated on the waves.

Another important aspect of the invention involves the direction of torsional wave propagation through the drill string. According to this aspect of the invention, the torsional acoustic waves may be launched downwardly through the drill string from the surface or upwardly through the drill string from the lower end of the string. In the preferred practice of the invention involving transmission of telemetric signals representing selected drilling parameters, the torsional acoustic waves are luanched downwardly through the drill string from the surface drilling platform to a subsurface signal-transmitting station at the lower end of the drill string. The waves arriving at the lower transmitting station are modulated with the telemetric signals to be monitored and returned back through the drill string to a signal receiving station at the drilling platform where the modulated waves are demodulated to recover the transmitted signals. This method of wave propagation is permitted because of the above-described reduction in acoustic transmission losses which results from the use of torsional acoustic waves, particularly torsional waves of zero order whose frequencies lie within the base band of the drill string acoustic transmission characteristics. Such a propagation method is preferred for the reason that the torsional wave generator, comprising a transducer and its electronic driving circuitry, may be located out of the well bore at the drilling platform. The torsional wave generator is thereby isolated from the hostile environment in the well bore and is readily accessible for repair and servicing without removal of the drill string. Also, the drill string envelope imposes no constraint on the size and arrangement of the generator. However, it is considered to be within the scope of the invention to launch the torsional waves upwardly through the drill string from a subsurface signal-transmitting station.

In those applications involving transmission of control signals through the drill string from a signal-transmitting station at the drilling platform to a subsurface signal-receiving station along the drill string, the torsional waves are preferably launched downwardly through the drill string from the surface. Here again, however, it is considered to be within the scope of the invention to launch waves upwardly through the drill string from its lower end, modulate the waves at the surface signal-transmitting station with the control signals to be transmitted, and return the modulated waves back downwardly through the drill string to the subsurface signal-receiving station.

A further important aspect of the invention is concerned with the actual generation of the torsional acoustic waves within the drill string. According to this aspect, the invention contemplates two different methods of acoustic wave generation. One method involves utilization of the torsional acoustic waves which are inherently produced in a rotating drill string during a drilling operation. In this regard, it is well-known that a drill string cutting bit, in the process of cutting into an earth formation, generates large quantities of noise which are transmitted along the drill string. Since the cutting motion is primarily a turning or twisting motion, a large component of this noise is torsional in character, i.e., consists of torsional acoustic waves. Such torsional waves are composed of relatively broadband components and narrow spectral lines or frequency bands generated by the teeth of a cutting bit and the gears in the mechanical drill string drive. The rotation generated torsional waves can be modulated at the bottom of the drill string in a manner to effectively transmit upwardly through the string selected torsional wave components representing information signals. These signals may be detected at the surface to recover the transmitted information.

The preferred method of acoustic wave generation contemplated by the invention involves the use of a transducer, preferably a crossed-field magneto-strictive transducer, energized by an electrical driving signal of the proper frequencies to drive the drill string in torsional acoustic oscillation in a manner to produce in the string torsional acoustic waves of zero order.

In this latter regard, a further important aspect of the invention is concerned with a novel crossed-field magnetostrictive transducer for the present drill string communication system. This transducer may be utilized as a torsional acoustic wave generator for the drill string, an acoustic signal transmitter, and/or an acoustic signal receiver. A major advantage of the transducer resides in its self-supporting construction which permits the transducer to form a load bearing part of the drill string. One transducer disclosed herein, for example, is embodied directly in the drilling kelly. Another advantage of the transducer resides in its ability to drive the drill string in its base band of torsional acoustic transmission. In this band, the acoustic attenuation or acoustic transmission losses produced by the drill string are minimized. This reduction of the acoustic transmission losses in the drill string, along with the earlier mentioned reduction in transmission losses resulting from the use of torsional waves, enable operation of the present communication system in its preferred operating manner, referred to earlier. It will be recalled that in this preferred operating manner, the torsional acoustic waves are launched downwardly through the drill string from the surface, modulated at the subsurface signal-transmitting station with the telemetric signals to be monitored, and then returned back to the surface signal-receiving station.

Additional aspects of the invention are concerned with a novel swivel for the drill string communication system and with the means for modulating torsional acoustic waves in the drill string with the signals to be transmitted. These modulating means may vary widely in design and construction and may be electrical, electronic, or mechanical in character.

BRIEF DESCRIPTION OF THE DRAWINGS

FIG. 1 illustrates well bore drilling apparatus embodying a drill string communication system according to the invention;

FIG. 2 is an enlarged detail of the rotary table kelly and hoist of the drilling apparatus;

FIG. 3 is an enlarged longitudinal section through the drilling kelly illustrating a magnetostrictive transducer embodied in the kelly;

FIG. 4 is a further enlarged section taken on line 4—4 in FIG. 3;

FIG. 5 is an enlarged section taken on line 5—5 in FIG. 4;

FIG. 6 is an enlarged section taken on line 6—6 in FIG. 3;

FIG. 7 is an enlarged section through an inertial modulator embodied in the communication system;

FIG. 8 is a section taken on line 8—8 in FIG. 7;

FIG. 9 is a section taken on line 9—9 in FIG. 7;

FIG. 10 is a diagrammatic illustration of the drill string communication system;

FIGS. 11-13 are diagrams of the well bore modulator electronics of the communication system;

FIG. 13A is a diagram of the accoustic transmission characteristics of a drill string;

FIG. 16 illustrates a modified crossed-field magnetostrictive transducer according to the invention;

FIG. 17 is a section taken on line 17—17 in FIG. 16;

FIG. 18 is a section taken on line 18—18 in FIG. 16;

FIG. 19 diagrammatically illustrates a modified drill string communication system according to the invention, wherein modulated torsional acoustic waves are launched upwardly from the lower end of the drill string;

FIG. 20 is a diagram of the surface receiving electronics of the communication system of FIG. 19;

FIG. 21 diagrammatically illustrates a further modified drill string communication system according to the invention wherein information is transmitted to the surface only in response to command signals from the surface;

FIG. 22 illustrates a further modified crossed-field magnetostrictive transducer according to the invention;

FIG. 23 is an enlarged section taken on line 23—23 in FIG. 22 with the field coil omitted for clarity; and FIG. 24 illustrates a further modified magnetostrictive transducer according to the invention.

DESCRIPTION OF THE PREFERRED EMBODIMENTS

Figure 14:
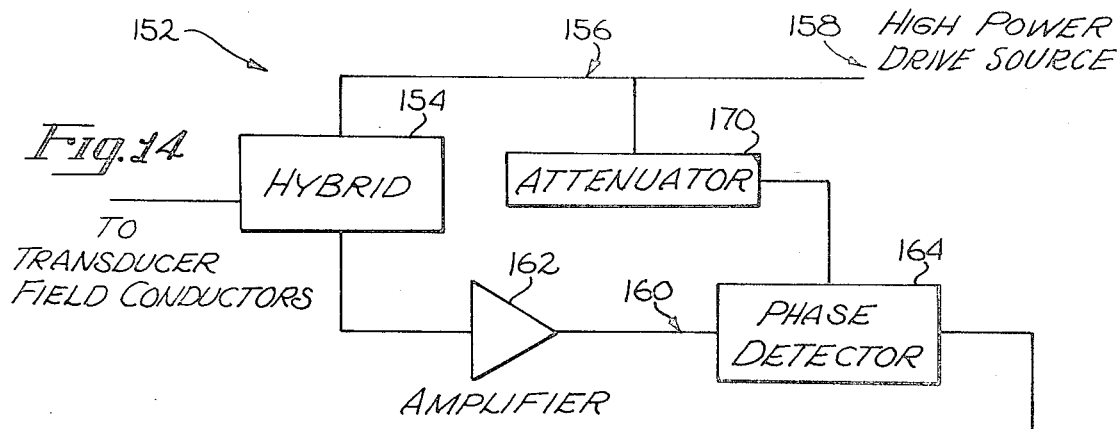
FIG. 14 is a diagram of the top side transducer electronics of the communication system.

Turning now to FIGS. 1-14, there is illustrated a communication system 10 according to the invention for transmitting information through a subsurface pipe 12 from a signal-transmitting station 14 to a signal-receiving station 16 through an intervening length 17 of the pipe which is capable of sustaining torsional acoustic oscillations. The communication system includes wave generating means 18 for inducing in the pipe 12 torsional acoustic waves, means 20 at the signal-transmitting station 14 for modulating waves with a modulating signal representing the information to be transmitted, and receiving means 24 at the signal-receiving station 16 for demodulating the modulated waves to recover the transmitted signals. The particular embodiment of the invention selected for illustration represents the primary application of the communication system. In this case, the pipe 12 is a drill string suspended within a well bore 26 from a surface drilling platform 28. The communication system is utilized to transmit signals along the drill string between the transmitting and receiving stations. These transmitted signals may be either control signals for operating, from the drilling platform, a device within the well bore, or telemetric signals representing selected drilling parameters to be monitored at the platform.

The drilling platform 28 is conventional and hence need not be described in elaborate detail. Suffice it to say that the platform has a derrick 30 mounted on a floor 32 and supporting a hoist 34. Hoist 34 includes a traveling block 36 supported by a cable 38 and carrying a swivel 40. This swivel provides a rotatable connection between the traveling block and the drilling kelly 42 at the upper end of the drill string 12. Kelly 42 extends downwardly through a rotary table 44 on the derrick floor 32 and through the well casing 46 and a blow-out preventer 48 sealed to the wall of the well bore as at 49. The upper end of the drill string 12 proper is connected to the lower end of the kelly. The hoist 34 and rotary table 44 are powered by a draw works 50. A drilling fluid circulation pump 52 delivers drilling fluid or mud under pressure from a mud pit 54 or other fluid reservoir to the swivel 40 through a mud hose 56. The mud flows downwardly through the kelly 42 and the drill string 12 and finally returns to the surface through the well bore, about the outside of the drill string, and then through blow-out preventer 48. The mud flows from the blow-out preventer back to the reservoir through a return line 58.

Drill string 12 is composed of individual drill pipe sections 60 of usually uniform length joined end to end by couplings 62 which are commonly referred to as tool joints. In some cases the drill string may contain additional sections, known as drill collars. Each drill string section 60 normally has a length of approximately 30 feet. Drill collar 63 and a drill bit or cutter 64 are coupled to the lower end of the drill string.

In operation of the illustrated drilling rig, the rotary table 44 is driven in rotation by the draw works 50 to drive the kelly 42 and hence the drill string 12, in its rotary drilling motion. The hoist 34 is operated to support a portion of the drill string weight, such as to maintain the proper drilling pressure on the cutter 64. The mud pump 52 is operated to provide continuous circulation of drilling mud through the well bore to lubricate the cutter and remove debris from the well bore.

The particular acoustic communication system 10 of the invention which has been selected for illustration in FIGS. 1–14 is designed for monitoring selected drilling parameters in the vicinity of the drill bit in order to provide the drilling operator with sufficient information to effectively control the drilling operation. As noted earlier, typical drilling parameters which provide valuable information to the drilling operator are temperature, formation pressure, formation porosity, drill string orientation, and others. In this case, the signal transmitting station 14 is located at the lower end of the drill string 12, and the signal-receiving station 16 is located at the drilling platform 28. Sensors 65 are shown mounted within the drill collar 63 to sense the drilling parameters to be monitored. These sensors are connected to the modulating means 20 and provide signals representing the monitored drilling parameters. The modulating means processes the sensor output signals to provide a modulating or telemetric signal containing information representing all of the monitored drilling parameters and modulates the acoustic waves induced in the drill string 12 by the wave generating means 18 with the telemetric signal. The modulated waves travel up the string to the surface signal-receiving station 16 where the waves are demodulated by the receiving means 24 to recover the transmitted drilling parameter information.

In certain of its aspects the invention contemplates the use of any acoustic waves capable of modulation by the telemetric signal to be transmitted and capable of propagation through the drill string 12 with sufficiently small acoustic loss and dispersion over the length of the drill string to provide efficient signal reception at the signal receiving station 16. In this regard, it is significant to recall that torsional acoustic waves, however are superior to all other acoustic wave forms, such as longitudinal and flexural for acoustic signal transmission through a drill string, since torsional waves couple less acoustic energy into the drilling fluid and the wall of the well bore. According to the preferred practice of the invention, especially for depths at which communication becomes difficult, or otherwise impossible, the torsional waves used for signal transmission are torsional acoustic waves of zero order. Such waves are characterized by pure rotation of each transverse section of the drill string within an advancing wave front about the longitudinal axis of the string. The major advantage of such zero order torsional waves resides in the fact that they are non-dispersive. Most other acoustic modes of propagation are dispersive. Non-dispersive torsional wave propagation is desirable, and essential to rapid efficient signal transmission through a drill string, since dispersion smears the transmitted signal along the string and renders difficult recovery of the signal at the signal receiving station.

The frequency of the torsional waves is also an important factor in efficient signal transmission through the drill string 12 in that the couplings 62 which join the drill string pipe sections 60 acoustically load the string and the mud about the string attenuates higher frequencies of acoustic oscillation. The jointed string thus tends to pass lower acoustic frequencies with less attenuation than higher frequencies, due to the frequency dependent attenuation of the mud, while the couplings 62 introduce zeros of transmission as shown in FIG. 13A. According to the preferred practice of the invention, the frequency of the torsional acoustic waves employed for signal transmission is selected to effect wave propagation through the drill string in its base band of transmission. This is the band from zero frequency to the first zero of transmission $F_o$. In this band, the mud produces minimum attenuation of the waves and thus permits maximum signal transmission through the string. However, in its broader scope, the invention contemplates acoustic wave propagation through the drill string in its higher pass bands so long as suitable signal reception is possible at the signal receiving station. As will appear from the later description, operation of the present drill string communication system in the base band is permitted by a unique crossed-field magnetostrictive transducer of the invention capable of inducing in the string torsional acoustic waves of the relatively low frequency required for such base band operation.

In its broader aspects, the invention also contemplates various means 18 for inducing or launching the torsional acoustic waves through the drill string 12. The preferred torsional wave launching means is a torsional acoustic wave generator including a crossed-field magnetostrictive transducer. An important feature of the invention in this regard resides in novel crossed-field magnetostrictive transducer configurations which may be utilized to launch the waves through the drill string as well as to modulate the waves and receive the modulated waves. A unique feature of these transducers is their rugged self-supporting construction which permits the transducers to form an integral load supporting element of the rotating drill string system. The drill string communication system in FIGS. 1–14, for example, employs a crossed-field magnetostrictive transducer which is embodied in and forms a load bearing part of the kelly 42. An alternative method of acoustic wave generation contemplated by the invention involves utilization of the torsional acoustic waves or torsional noise inherently produced in a rotating drill string.

The earlier discussed reduction in acoustic transmission losses resulting from utilization, in the present drill string communication system, of torsional acoustic waves, particularly zero order torsional waves within the base band frequency range of the drill string 12, together with the self-supporting construction of the present magnetostrictive transducers permits various types of acoustic wave communication through the drill string. When monitoring drilling parameters, such as those mentioned earlier, the preferred method of communication involves launching the waves downwardly through the drill string from the surface to the subsurface signal-transmitting station 14. The waves are modulated at this station with the telemetric signal representing the drilling parameters to be monitored and returned upwardly through the drill string to the surface signal receiving station 16. A primary advantage of this communication method resides in the fact that the torsional wave generating transducer may be located out of the well bore. The transducer is then isolated from the hostile environment in the well bore, is readily accessible for servicing and repair without removal of the drill string, and is free of the design constraints imposed by the drill string envelope.

The drill string communication system illustrated in FIGS. 1–14 employs this preferred method of acoustic communication. Referring now in greater detail to this communication system, the means 18 for inducing torsional acoustic waves in the drill string 12 comprises a torsional acoustic wave generator which is embodied in the drilling kelly 42. Broadly, these may be of any suitable form. The preferred generator, however, includes a lower crossed-field magnetostrictive transducer 66 according to the invention, and an upper torque reaction stub 70, as shown in FIG. 3. The transducer and torque reaction stub have tubular bodies 72, 76, respectively, rigidly joined end to end in any convenient way. These tubular bodies have a uniform, non-circular, usually square, cross section matching that of a conventional drilling kelly and together constitute the drilling kelly 42.

The lower end of the kelly 42, that is, the lower end of transducer body 72, is coupled to the upper end of the drill string 12 by a tool joint 78. Swivel 40 is rotatably coupled to an extension 79 at the upper end of the kelly, that is, to the upper end of the upper reaction stub body 76. As shown in FIGS. 1–14, this swivel has an inverted cup-like housing 80 receiving the upper end of the stub body extension 79. The housing is attached to the extension by a pair of combined radial and thrust bearings 82. A seal ring 84 provides a liquid tight seal between the housing and extension. The kelly 42 is thus restrained against longitudinal movement but is free to rotate relative to the swivel housing 80. At the upper end of the housing is a lifting bail 86 by which the housing and hence the kelly 42 and drill string 12, are suspended from the travelling block 36 of hoist 34.

The mud hose 56 connects to the swivel housing 80 and opens to the interior housing chamber 88 above the seal 84. Extending centrally through the kelly 42 is a mud passage 90 through which drilling mud entering the chamber 88 through the mud hose 56 flows to the central mud passage in the drill string 12.

As noted above, the torsional wave transducer 66 is a crossed-field magnetostrictive transducer. Transducers of this general class are known in the art. Such a transducer requires an elongated body of magnetostrictive material and means for establishing two magnetic fields within the body. One field is an axial field whose field lines extend longitudinally through the body. The other field is a transverse field whose field lines extend circumferentially through the body. One field is commonly referred to as a bias field and the other as a signal field. Either field may serve as the bias field and the other field as the signal field. The interaction of the bias and signal fields produces a torsional strain in the body which may be caused to fluctuate in such a way as to induce torsional oscillations in the body by varying, at the proper frequency, either or both the bias and signal fields. In this mode, the transducer is either a torsional wave generator or modulator, i.e., signal transmitter. The transducer is also capable of operating in an acoustic signal receiving mode. Thus, a torsional strain within the transducer body with only one of the transducer fields present induces in the other field conductors a voltage, at the conductor terminals, proportional to the rate of strain. The communication system of FIGS. 1–14 employs the magnetostrictive transducer 66 as both a torsional wave generator and a signal receiver.

In such a crossed-field magnetostrictive transducer, the fields in the longitudinal and circumferential directions may be established in various ways. For example, the field in the circumferential direction may be established by passing a current longitudinally through the transducer body or through a conductor within the body. The field in the longitudinal direction may be established by passing a current through a coil surrounding the body. Alternatively, either field may be established by constructing the transducer body of a magnetically remanent magnetostrictive material which is permanently magnetized in the proper direction. The field in the longitudinal direction may also be established by permanent magnets along the transducer.

Suitable materials for the body of a transducer designed for such remanent operation are iron - cobalt alloys, such as 50 – 50 iron cobalt, or ternary iron - cobalt alloys, such as 2V Permandure containing approximately 49 percent iron, 49 percent cobalt and 2 percent vanadium, or nickel-cobalt alloys such as Ni204 containing approximately 4 percent cobalt and 96 percent nickel. Also suitable are iron-nickel-cobalt alloys, including multi-element alloys based on the iron-nickel-cobalt complex as are many alloys consisting of one of the magnetic elements iron-nickel-cobalt in combination with non-magnetic elements such as an alloy consisting of approximately 12 percent aluminum and 88 percent iron. For non-remanent transducer operation, the transducer body may be constructed of nickel or any of the magnetostrictive alloys of nickel and iron commonly called permalloys, such as 50 – 50 nickel iron, or some of the more complex alloys such as NiSpan C, containing nickel, iron, titanium, and chromium.

It is significant to note here that in the present drill string communication applications, the mechanical properties of the transducer body also enter into the selection of the magnetostrictive material for the body. Foremost among these mechanical properties are machinability, tensile strength, effect of tensile stress on the magnetostrictive characteristics, electrical conductivity, and others.

The crossed-field magnetostrictive transducer 66 embodied in the well drilling apparatus of FIGS. 1–14 is designed for remanent operation. To this end the transducer body 72 has a major central portion 72P constructed of a magnetically remanent magnetostrictive material. In this instance the material is biased with a remanent field in the longitudinal direction.

Fixed to and extending the full length of the kelly mud passage 90 is a sleeve 94 of copper or the like which provides an inner signal-field conductor of the transducer. Fixed within channels 96 in the four sides of and extending the full length of the kelly 42 are strips 98 of copper or the like which provide outer signal-field conductors of the transducer. These outer conductors are electrically insulated from the transducer body 72 by electrical insulation 100. The lower ends of the inner and outer conductors 94, 98 are electrically connected at 102. The upper ends of the conductors are electrically connected to the leads of a cable 104 through collector rings 106 surrounding the upper end of the kelly 42 and collector brushes 108 carried by the swivel housing 80. The upper collector ring is assured good electrical contact to the inner conductor by means of copper rivets 107. The lower collector ring is in direct electrical contact with the outer conductors.

As will be explained in more detail presently, a driving signal is applied to the transducer signal-field conductors 94, 98, through the cable 104. This driving signal produces in the conductors a fluctuating current which induces in the transducer body 72P a circumferential magnetic signal field that interacts with the longitudinal remanent bias field of the body to produce an alternating torsional strain in the body. Such alternating torsional strain, in turn, propagates as a torsional wave downwardly through the drill string 12 to the subsurface signal transmitting station 14. The torsional waves are modulated at the signal transmitting station with a telemetric signal representing the drilling parameters to be monitored and returned upwardly through the drill string to the surface, in the manner to be explained presently. These modulated waves are received by the transducer 66 and then demodulated to recover the transmitted signal.

It will be recalled from the earlier description that the invention, in its broader aspects, contemplates any torsional acoustic waves capable of propagation through the drill string 12 and capable of modulation by the telemetric signal to be monitored to achieve effective signal transmission from the subsurface signal transmitting station 14 to the surface signal receiving station 16.

It will be further recalled, however, that the preferred waves are torsional acoustic waves of zero order and of the proper frequency to effect wave propagation through the drill string 12 in its base band. In this latter regard, attention is directed to FIG. 13A. This figure depicts the relationship between quantity T, representing the relative transmission of torsional acoustic wave propagation through a drill string, and the frequency $f$ of the torsional waves expressed in units of the quantity $f_o$. This latter quantity is the torsional wave frequency at which the transmission quantity T first becomes zero. The frequency quantity $f_o$ is related to the velocity $c$ of torsional wave propagation through the drill string and a distance $d$, (the effective acoustic distance between the drill string couplings 62) by the following equation.

$$f_o = c/4d$$

As indicated in FIG. 13A, the base band of torsional wave propation through the drill string 12 occurs in the region between $f = 0$ and $f = f_o$. From this it will be understood that propagation of the torsional acoustic waves of the invention through the drill string 12 is accomplished by exciting the transducer 66 with a driving signal having frequency components such that if $f$ is the frequency of a component, then $$0 \le f/f_o \le 1$$

For a standard drill string composed of 30 foot pipe sections and conventional tool joint couplings 62, $f_o$ is on the order of 80 Hz.

Returning again to the torsional wave transducer 66, the transducer body 72 will be recalled to have a torque reaction stub 70 which provides an acoustic reaction termination at the upper end of the transducer. While this upper reaction stub or termination may conceivably be designed to serve as an absorbing termination, the particular termination shown is assumed to be a reflecting termination.

The theory of reflecting terminations is well understood and hence need not be explained in great detail. Suffice it to say that the correct length of a reflecting termination depends on the nature of the reflections occurring at the upper end of the termination. For example, if the upper end of the termination is open or free, with no acoustic connection to any structure, the end constitutes a node for torque and an antinode for torsional displacement. In this case, the optimum termination length is an odd number of quarter wave lengths of the acoustic waves to be reflected. On the other hand, if the end of the termination is acoustically rigid, that is, anchored to a very large mass with an acoustic impedance large relative to that of the transducer and termination, the end of the termination is an antinode for torque and a node for torsional displacement. In this case, the optimum termination length is an even number of quarter wave lengths of the acoustic waves to be reflected. For intermediate cases, the termination must have an intermediate length determined by the acoustic conditions at the end of the termination. Obviously, the torque reaction stub or termination 70 represents such an intermediate case and must be dimensioned accordingly.

It will be understood from the description to this point that the transducer 66 is excited with a driving signal of the proper frequencies to launch torsional acoustic waves of zero order downwardly through the drill string 12 in the base band of the drill string. The manner in which this driving signal is generated will be explained presently. Suffice it to say here that the driving signal is applied to the transducer through the cable 104, collector brushes 108, collector rings 106 and the upper rivets 107. The waves are modulated at the subsurface signal transmitting station 14 by the modulating means 20 and returned to the signal receiving station 14, to provide at the receiving station modulated waves containing information representing the drilling parameters to be monitored.

It will be immediately evident to those versed in the art that a variety of acoustic wave modulating means 20 may be employed in the present drill string communication system. FIGS. 7–9 illustrate an inertial modulator for the system. This inertial modulator has a central tube or pipe 110. Surrounding the upper end of the modulator pipe 110 is a relatively massive inertial cylinder 118. Inertial cylinder 118 is rotatably supported on and restrained against movement along the pipe 110 by combined radial and thrust bearings 120. Seals 122 seal the ends of cylinder to the pipe. Between its ends, the inertial cylinder 118 is internally enlarged to define an annular chamber 124 between the cylinder and the pipe 110. This chamber is filled with a magnetic fluid 126, such as a mixture of oil and powdered iron. Contained in four uniformly spaced longitudinal slots 128 in the portion of the modulator pipe 110 within the chamber 124 is a drive coil 130. As shown best in FIG. 8, the conductors of the drive coil extend lengthwise of the slots 128. Moreover, as indicated by the + and − signs in the figure, the drive coil is wound in such a way that when a voltage is impressed across the coil, current flows in one direction through the conductors in two diametrically opposed slots and in the opposite direction through the conductors in the remaining two diametrically opposed slots.

It will now be understood that the modulator structure described thus far constitutes, in effect, an electromagnetic clutch. Thus, when the drive coil 130 is deenergized, the pipe 110 and inertial cylinder 118 are capable of relatively free relative rotation. Energizing of the drive coil produces a magnetic coupling between the pipe and cylinder which resists relative rotation of the pipe and cylinder with a torque proportional to the current flow through the drive coil.

Surrounding and fixed to the modulator pipe 110 below the inertial cylinder 118 is an annular circuit housing 132 containing the driving circuit 134 for the modulator drive coil 130. The drive coil is connected to the output of the circuit through leads 135. Modulator driving circuit 134 will be described shortly.

Between the modulator 20 and the drill collar 63 is a lower reactance termination 136. This reactance termination comprises a section of drill pipe or a pipe collar of the proper mass and length to constitute a reflecting termination for the torsional accoustic waves launched downwardly through the drill string 12 by the topside transducer 66. The earlier discussion relative to the topside reflecting termination 70 applies with equal force to the termination 136. The modulator pipe 110 and lower termination are connected end to end in the drill string 12 by conventional tool joints. In this regard, it will be observed that the latter pipe and termination transmit drilling torque to the drilling cutter 64 and support the weight of the drill string below and thus must be designed to have sufficient torsional and tensile strength to withstand these loads. Extending through the pipes are mud passages which form a continuation of the drill string mud passage.

As noted earlier, it is desirable or necessary during a drilling operation to monitor several different drilling parameters in the vicinity of the drilling cutter 64. Some of these parameters were listed in the earlier description and thus need not be repeated here. Suffice it to say that the sensors 65 are selected and arranged within the drill collar 63 to be responsive to the particular drilling parameters to be monitored. In this regard, it is significant to note that sensors for this purpose are well-known and available on the commercial market. Accordingly, it is unnecessary to describe the sensors except to say that each sensor produces an electrical output representing its respective drilling parameter.

The several sensors 65 are electrically connected through leads 146 to the input of the modulator driving circuit 134.

The modulator driving circuit 134 will be explained presently. Suffice it to say here that the circuit effectively combines the several outputs from the drilling parameter sensors 65 and produces a telemetric signal containing information representing all the drilling parameters. This telemetric signal is processed to produce a corresponding modulator driving signal which is applied to the modulator drive coil 130 and produces a corresponding fluctuating magnetic coupling between the inner pipe 110 and outer inertial cylinder 118 of the modulator 20. As a consequence the torsional acoustic waves propagating downwardly through the drill string 12 and the modulator pipe 110 to the lower reaction termination 136 and then reflected from the termination upwardly through the pipe and drill string are modulated to contain information representing the drilling parameters being monitored. Thus, an increase in the magnitude of the modulator driving signal produces a corresponding increase in the magnetic coupling between the modulator pipe and inertial cylinder, thereby increasing the effective torsional mass of the pipe and retarding the phase as well as altering the amplitude of the waves when traveling through the modulator. Similarly, a decrease in the magnitude of the driving signal produces a corresponding reduction in the magnetic coupling between the modulator pipe and intertial cylinder, thereby reducing the effective torsional mass or movement of the pipe and advancing the phase as well as altering the amplitude of the waves then traveling through the modulator.

The modulated waves travel upwardly through the drill string 12 to the surface signal receiving station 16. These modulated waves produce a corresponding fluctuating torsional strain in the magnetostrictive body 72 of the transducer 66, thereby inducing in the transducer field conductors 94, 98 a fluctuating voltage containing information representing the transmitted telemetric signal. As explained below, the voltage signal from the transducer is processed by a combined transducer driving-receiving circuit at the surface to recover the transmitted information representing the drilling parameters being monitored.

A variety of torsional acoustic modulators, other than the inertial modulator described above may be employed in the present drill string acoustic communication system. By way of example, a crossed-field magnetostrictive transducer similar to the top side transducer 66 may be employed as a modulator. In this regard, attention is directed to FIGS. 16–18 illustrating a modified magnetostrictive transducer 66b according to the invention which may be utilized as a modulator. This same transducer configuration may be utilized to launch modulated torsional acoustic waves through the drill string, as will be described in connection with the communication system of FIGS. 19 and 20.

Turning now to FIG. 11 there is illustrated the general arrangement of the modulator driving circuit 134 which is contained in the modulator circuit housing 132. As noted, this circuit converts the outputs from the drilling parameter sensors 65 to a coded driving signal for the modulator 20. This driving circuit includes a power source (not shown), such as a battery, an encoder 148 and modulator driving circuitry 150. The encoder is connected to the drilling parameter sensors 65 to receive the several sensor outputs and processes these outputs to produce a telemetric signal containing information representing all of the sensor outputs. This telemetric signal is applied to the driving electronics 150 which processes the signal in such a way as to produce a modulated driving signal for the modulator drive coil 130.

The driving circuit 134 may utilize various signal processing techniques for converting the outputs from the drilling parameter sensors 65 to a suitable driving signal for the inertial modulator 20 or for a crossed-field magnetostrictive transducer when employed as a modulator. FIGS. 12 and 13 illustrate possible signal processing techniques for this purpose. These illustrated signal processing techniques are well-known and understood so that an elaborate description of the same is unnecessary.

Suffice it to say that FIG. 12 is a binary phase coded system wherein the encoder 148 is a binary digital encoder for converting the analog outputs from the sensors 65 to a binary digital signal containing information representing the outputs of all the sensors. the modulator driving circuit 150 is a power amplifier which amplifies this binary digital signal to the proper strength for driving the modulator 20. FIG. 13 is a frequency shift keyed system suitable for use with a magnetostrictive transducer as will be explained presently in connection with communication system 10b (FIGS. 19 and 20). In this case, the encoder 148 is a digital encoder which converts the outputs of the sensors 65 to a digital frequency shift keying signal containing information representing all of the sensor outputs. The modulator driving electronics 150 includes a frequency shift keyer 150a which converts the encoder output to a frequency shifted transducer driving signal and a power amplifier 150b for amplifying the signal to the proper strength for driving the transducer.

Considering now the system of FIG. 10, there is connected to the topside transducer 66 a driving and receiving electronic system 152, comprising means 154 (FIG. 14) for separating the driving signal to and the information signal from the transducer. The means 154 shown in FIG. 14 is a hybrid junction having one branch connected to the transducer field conductors 94, 98. A second branch of the hybrid is connected to a transducer driving circuit 156 including a high power drive source 158. Connected to the third branch of the hybrid is a transducer receiving circuit 160 including an amplifier 162, phase detector 164, digital decoder 166, and an output display or recorder 168. The reference input of the phase detector 164 is connected to the source 158 through an attenuator 170.

The operation of transducer 66 and driving and receiving circuit 152 will be immediately evident to those versed in the art. Thus, the hybrid junction 154 feeds the high power driving signal from the source 158 to the transducer field conductors 94, 98 to drive the transducer to launch the earlier described torsional acoustic waves downwardly through the drill string 12. At the subsurface signal transmitting station 14, these waves are modulated to contain the information representing the telemetric signal to be transmitted and are returned upwardly through drill string 12. These modulated waves produce a fluctuating torsional strain in the transducer body 72 and thereby a corresponding fluctuating voltage signal in the transducer field conductors 94, 98. The hybrid junction 154 feeds this voltage signal to the receiving circuit 160. This signal is amplified by amplifier 162 and its phase is compared to the phase of the transducer driving signal in the phase detector 164 to provide an output representing the telemetric signal. The digital decoder 166 reduces the output of the phase detector to discrete output signals representing the various monitored drilling parameters. These output signals are then displayed or recorded as drilling parameter information by the display or recorder 168.

Figure 15:
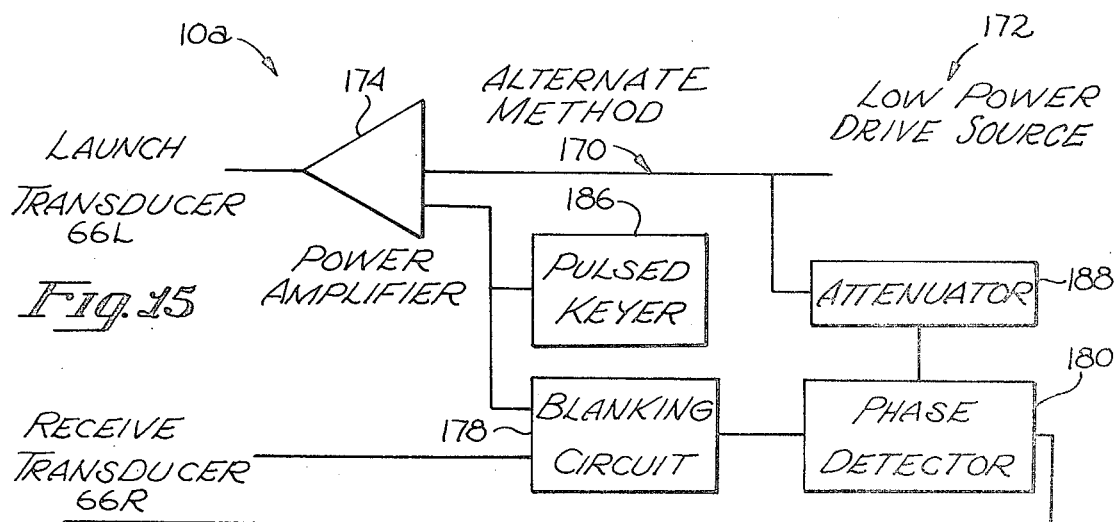
FIG. 15 is a diagram of the top side transducer electronics of a modified drill string communication system having separate acoustic wave launching and receiving transducers.

In some applications it may be desirable or essential to employ separate transducers at the surface for launching the torsional acoustic waves downwardly through the drill string 12 to the subsurface signal transmitting station 14 and receiving the modulated waves returning to the surface. FIG. 15 illustrates such a dual transducer communication system 10a. In this system, the single transducer 66 in FIGS. 1-14 is replaced by launch and receive transducers 66L, 66R coupled end to end at the upper end of the drill string. The launch transducer has a driving circuit 170 comprising a low power source 172 connected through a power amplifier 174 to the field conductors 94, 98 of the transducer. The receiving transducer has a receiving circuit 176 connected to the field conductors 94, 98 of the transducer. This circuit includes a blanking circuit 178, phase detector 180, digital decoder 182, and output display or recorder 184. A pulse keyer 186 is connected to the amplifier 174 and blanking circuit 178, phase detector 180 is connected through an attenuator 188 to the source 172.

The operation of communication system 10a is similar to that of communication system 10, except that the driving and receiving circuits 170, 176 are activated alternatively by the pulse keyer 186. During the intermittent transducer driving modes of the system 10a, the pulse keyer conditions the launch amplifier 174 to feed an amplified signal to the launch transducer 66L and conditions the blanking circuit 178 to block the output of the receiver transducer 66R. Under these conditions the launch transducer 66L is driven by the amplified driving signal from the source 172 to launch torsional acoustic waves downwardly through the drill string 12. During the intervening transducer receiving modes of the system, the pulse keyer 186 conditions the launch amplifier 174 to block signal transmission to the launch transducer 66L and conditions the blanking circuit 178 to pass the output of the receiver transducer 66R. Under these conditions, the fluctuation voltage signal induced in the receiving transducer 66R by the returning modulated waves is fed to the receiving circuit 176 to produce a display or recording of the drilling parameter information being monitored.

The present drill string communication systems described to this point employ the preferred mode of wave propagation from the surface to the subsurface signal transmitting station and return of the modulated acoustic waves to the surface. The reasons why this mode of propagation can be employed and its advantages were explained earlier and need not be repeated here. In some applications, it may be desirable or necessary to employ the alternate mode of wave propagation referred to earlier, i.e., launching of the modulated waves directly from the subsurface signal transmitting station 14. FIGS. 19 and 20 diagrammatically illustrate a drill string communication system 10b which employs this alternate propagation mode.

Communication system 10b is identical to system 10 except for the replacement of the modulator 20 by the crossed-field magnetostrictive transducer 66b of FIGS. 16–18 and modification of the transducer driving and receiving electronics. Turning first to FIGS. 16–18, it will be seen that the subsurface transducer 66b is similar to the topside transducer 66 and differs from the latter in that transducer 66b is inverted and includes a circuit housing 190 surrounding the lower end of the transducer body 72. Within this housing is the electronic circuitry 192 for processing the outputs of the drilling parameter sensors 65 to produce a modulated transducer driving signal containing information representing the drilling parameters being monitored. Also the outer transducer field conductor 98 is a copper sleeve, rather than bars fitting in slots in the tranducer body as in the topside transducer 66. Transducer 66b may employ such an outer conductor sleeve, of course, since it is not required to couple to the driving torque of the rotary table 44, as with the topside transducer.

During operation of the drill string communication system 10b of FIGS. 19, 20, the lower well bore transducer 66b is driven by the modulated driving signal from its driving circuitry 192 to launch upwardly through the drill string 12 modulated torsional acoustic waves containing information representing the drilling parameters being monitored. These modulated waves induce in the field conductors 94, 98 of the topside transducer 66 a fluctuating voltage which is processed to recover the drilling parameter information.

The driving electronics 192 for the lower well bore transducer 66b may embody circuitry similar to that of FIG. 13, described earlier, for converting the output signals from the drilling parameter sensors 65 to a modulated transducer driving signal. In the case of transducer 66b, however, it will be understood that the driving electronics will include a power source capable of producing the energy required to induce in the drill string the desired acoustic torsional waves. Such a power source may comprise a battery connected to a charging generator driven by mud flow through the drill string. FIG. 20 illustrates the receiving circuit 198 for the topside transducer 66. The operation of this receiving circuit will be obvious to those versed in the frequency shift keying systems.

At this point, it is significant to recall that the well bore transducer 66b of FIGS. 16–18 may be employed as a modulator in a communication system which utilizes the preferred mode of wave propagation discussed in connection with FIGS. 1–14. In this regard, it will be understood that the communication system 10b of FIGS. 19, 20 may be operated in this preferred propagation mode by utilizing the well bore transducer 66b as a modulator only and replacing the topside receiving circuit 198 with a combined transducer driving-receiving circuit such as shown at 152 of FIGS. 10 and 14 for operating the topside transducer 66 to launch torsional waves downwardly through the drill string and receive the returning modulated waves.

The communication systems described to this point are designed primarily for relatively continuous monitoring of selected drilling parameters. It should be noted in this regard that in some drilling applications it may be possible to communicate effectively through the drill string 12 while drilling is actually in progress, i.e., while the string is being driven by the rotary table 44. In other cases, effective communication may require cessation of the drilling operation and release of the rotary table gripping jaws from the drill string.

FIG. 21 diagrammatically illustrates a drill string communication system 10c for transmitting drilling parameter information to the surface only in response to selected command or interrogation signals from the surface. The communication system selected for illustration is identical to that of FIGS. 19, 20 with the exception of the circuitry for the surface transducer 66 and the well bore transducer 66b. The surface electronic circuitry comprises a combined driving-receiving circuit 200 for the surface transducer 66 including a hybrid junction 202 having one branch connected to the field conductors of the topside transducer 66. A driving signal source 204 is connected to a second branch of the hybrid through a modulator or encoder 206 and a launch amplifier 208. The third branch of the hybrid is connected to a readout display or recorder 210 through a receive amplifier 212 and a demodulator or decoder 214. In the drilling parameter interrogate mode of the communication system 10c, the surface transducer 66 is driven by the driving signal source 204 to launch downwardly through the drill string 12 torsional acoustic waves containing the command signals. These command signals actuate the well bore signal transmitting means, as explained below.

The electronic circuitry for the well bore transducer 66b comprises a transducer driving circuit 215 like that of FIG. 11 and including a digital encoder 216 for transforming the outputs of the drilling parameter sensors 65 into a telemetric signal which is applied to the transducer 66b through an amplifier 218 and hybrid 220. The well bore circuitry also includes an actuator 222 connected to the transducer 66b through an amplifier 224 and the hybrid 220. This actuator is an electrical switch device connected between the power source 226 for the well bore circuitry and the driving circuit 215 and is actuated by the command or interrogation signals from the source to open and close the energizing circuit between the driving circuit 215 and power source 226. Actuators of this kind are well-known in the art. Accordingly, it is unnecessary to describe the actuator in detail.

Suffice it to say that in the normal operating mode of the communication system 10c, actuator 222 presents an open circuit between the power source 226 and the transducer driving circuit 215 so that no drilling parameter information is transmitted to the surface. The transponder is activated in response to the command signals from the surface to connect the power source to the driving circuit. Under these conditions, the driving circuit feeds to the well bore transducer a coded telemetric signal representing the outputs of sensors 65 for producing in the drill string 12 modulated acoustic waves which propagate to the surface where the waves are received and demodulated and their contained information is displayed or recorded by the receiving circuit 210, 212, 214. The major advantage of such a communication system is the conservation of the energy required to operate the well bore signal transmission system during those periods when transmission of information is not required. Obviously a similar arrangement may be employed to operate other devices in the well bore on command.

FIGS. 22, 23 illustrate a modified crossed-field magnetostrictive transducer 300 which may be employed in the invention. In this transducer, the longitudinal field is established by current flow through a coil 302 about the transducer body 304 rather than by magnetic remanence in the body. The circumferential field is established by current flow through longitudinal conductors 305 on the body. Alternatively, the circumferential field may be established by the use of a remanent transducer body which has a permanent field in the circumferential direction. As noted earlier, either the longitudinal field or the circumferential field of the transducer may be employed as the bias field and the remaining field as the signal field, or both fields may be used as signal fields. The transducer of FIG. 24 is like that of FIGS. 22, 23, except that the longitudinal field is established by permanent magnets 307.

In relatively large transducers, such as are required for the present drill string communication applications, however, the inductance of the longitudinal field coil 302 and the corresponding time constant of the coil circuit may be so large that the frequency response of the transducer may be too low. In this case, it is necessary to use the longitudinal field of the coil as a bias field and the circumferential field of the longitudinal transducer conductors as the signal field. Moreover, when the longitudinal field of the coil 302 is employed as the signal field, the transducer body 304 must be longitudinally slotted at 306 to prevent the signal field from inducing circumferential eddy currents in the body. When used in a drill string communication system, the body slot is sealed against mud leakage in any convenient way. This slot preferably extends only the length of the central magnetostrictive portion of the body to preserve the strength of its joints. In this case, high reluctance buffer sections 308 may be placed between the slotted body portion and tool joints to permit the longitudinal field to leak out to prevent eddy currents in the drill string and torque reaction stub. These buffer sections may be longitudinally slotted for the same reason as the body. When the circumferential field is employed as the signal field, the body slot is not required since the eddy circuits flow lengthwise of the transducer body and become negligible due to the long path length through the body.

The discussion to this point has been concerned with transducer operation only in a mode wherein the bias field is constant and the signal field is varied to launch torsional acoustic waves through the drill string 12 and modulate acoustic waves with drilling parameter information. However, the invention contemplates within its scope modulation of both fields. The transducer then becomes a multiplier wherein the instantaneous torque produced in the transducer body is the product of the bias and signal field amplitudes. This multiplier operating mode is particularly useful when the transducer is used as a modulator.

In the communication systems described to this point, an electrically driven transducer has been employed to generate the torsional acoustic waves in the drill string. As noted earlier, however, the communication system may utilize as an information carrier the torsional noise or acoustic waves inherently generated in a drill string during a drilling operation. Such noise consists of relative broad band random noise and narrow frequency bands both of which may be modulated to transmit information through the drill string. The communication system of FIG. 19, may be operated in this fashion by using the inertial modulator 20 and eliminating the lower drill string acoustic termination 136. In this operation a selected frequency band of the drilling noise is modulated by the inertial modulator and the topside transducer receiving circuit 198 is provided with a filter for passing only the selected frequency band. This selected frequency band of the output signal from the surface transducer 66 is processed to recover the transmitted information.

Those versed in the art will understand at this point that the drill string in the varous disclosed inventive embodiments constitutes an acoustic transmission line and that the various elements in the drill string, such as tool joints, acoustic wave generator and modulator, and the like, constitute perturbations in the string at which occur a complex action of partial reflection and partial transmission of the acoustic waves traveling through the drill string. However, it can be demonstrated by well-known mathematical transmission line analysis techniques that during operation of the present well bore communication system, the several acoustic wave reflections and transmissions result in transmission from the signal transmitting station to the signal receiving station of net or resultant modulated acoustic waves containing information representing the signal impressed on the modulator or transducer at the transmitting station and hence also representing the drilling parameter or other information to be transmitted. These net or resultant modulated acoustic waves are demodulated at the signal receiving station in the manner heretofore explained to recover the transmitted information.

From the foregoing description, it will be understood that various changes in the detailed construction and arrangement of the parts constituting the telemetering system for oil wells of the present invention may occur to those skilled in the art without departing from the spirit and scope of the present invention. Accordingly, it is to be understood that the foregoing description is considered to be illustrative of, rather than limitative upon, the invention as defined by the appended claims.

We claim:

1. A method of communicating information between signal-transmitting and signal-receiving stations spaced along a pipe having an intervening length between said stations capable of sustaining zero order torsional acoustic waves, said method comprising the steps of:
   generating a modulating signal containing the information to be transmitted;
   establishing in said pipe zero order torsional acoustic waves which are modulated according to a predetermined modulating mode by said modulating signal to contain the information to be transmitted and which travel from said transmitting station to said receiving station through said intervening pipe length; and
   receiving said waves at said receiving station to recover said signal and its contained information.

2. The acoustic communication method according to claim 1 wherein:
   said pipe is a drill string suspended from a drilling platform.

3. The communication method according to claim 1 wherein:
   said pipe is a drill string suspended within a well bore from a drilling platform;
   at least one of said stations is located within said well bore; and said torsional acoustic waves are induced in said drill string by driving said drill string in torsional oscillation at frequencies within a selected range of frequencies.

4. The acoustic communication method according to claim 1 wherein:

said pipe is a drill string suspended within a well bore from a drilling platform;

said transmitting station is located within said well bore and said receiving station is located above said transmitting station; and said torsional acoustic waves are established in said drill string by driving said string in torsional oscillation at frequencies within a selected range of acoustic frequencies to launch said acoustic waves upwardly through said drill string to said receiving station.

5. The acoustic communication method according to claim 1 wherein:

said pipe is a drill string suspended within a well bore from a drilling platform;

said drill string is composed of a number of pipe sections coupled end to end by intervening couplings; and the acoustic frequencies of said torsional acoustic waves are related to the nominal length of said drill string sections in a manner such that said drill string oscillates in at least one of its pass bands of torsional oscillation.

6. The acoustic communication method according to claim 5 wherein:

the acoustic frequencies of said torsional acoustic waves are related to the nominal length of said drill string sections in a manner such that said drill string oscillates in its base band of torsional oscillation.

7. The acoustic communication method of claim 1 wherein:

said pipe is a drill string suspended within a well bore from a drilling platform;

said receiving station is located within said well bore;

said transmitting station is located above said receiving station; and said signal is a command signal for effecting a selected function at said receiving station.

8. The acoustic communication method of claim 1 wherein:

said pipe is a drill string suspended within a well bore from a drilling platform;

said transmitting station is located within said well bore and said receiving station is located above said transmitting station;

said communication method comprises the further step of transmitting command signals through said drill string to said transmitting station; and said modulated acoustic waves are established in said drill string in response to said command signals.

9. A communication system for communicating information between signal-transmitting and signal-receiving stations spaced along a pipe having an intervening length between said stations capable of sustaining zero order torsional acoustic waves, said system comprising:

means for generating a modulating signal containing the information to be transmitted;

means for establishing in said pipe zero order torsional acoustic waves which are modulated by said modulating signal to contain the information to be transmitted and which travel from said transmitting station to said receiving station through said intervening pipe length; and receiving means coupled to said pipe at said receiving station for receiving said modulated waves to recover said signal and its contained information.

10. An acoustic communication system according to claim 9 wherein:

said pipe is a drill string suspended within a well bore from a drilling platform; and at least one of said stations is located within said well bore.

11. An acoustic communication system according to claim 10 wherein:

said means for establishing said acoustic waves comprises a torsional wave transducer coupled to said drill string for inducing in said drill string torsional acoustic waves of zero order.

12. A communication system according to claim 9 wherein:

said pipe is a drill string suspended within a well bore from a drilling platform;

said drill string is composed of a number of pipe sections coupled end to end by intervening couplings; and the acoustic frequencies of said torsional acoustic waves are related to the nominal length of said drill string sections in a manner such that said drill string oscillates in at least one of its pass bands of torsional oscillation.

13. An acoustic communication system according to claim 11 wherein:

said drill string is composed of a number of pipe sections coupled end to end by intervening couplings; and said transducer is adapted to be driven to produce in said drill string torsional acoustic waves related to the nominal length of said drill string sections in a manner such that said drill string oscillates in at least one of its pass bands of torsional oscillation.

14. An acoustic communication system according to claim 13 wherein:

said drill string is composed of a number of pipe sections coupled end to end by intervening tool joints; and the acoustic frequencies of said torsional acoustic waves are related to the nominal length of said drill string sections in the manner such that said drill string oscillates in its base-band of torsional oscillation.

15. An acoustic communication system according to claim 9 wherein:

said pipe is a drill string suspended within a well bore from a drilling platform;

said transmitting station is located within said well bore and said receiving station is located above said transmitting station; and said means for establishing said acoustic waves comprises an electrical transducer coupled to said drill string and adapted to be energized by an electrical driving signal to launch said acoustic waves upwardly through said drill string to said receiving station.

16. An acoustic communication system according to claim 9 wherein:

said pipe comprises a drill string suspended within a well bore from a drilling platform; one of said stations is located within said well bore;

said drill string includes a drilling kelly at the upper end of said string; and said means for receiving said acoustic waves comprise an electroacoustic transducer embodied in said kelly.

17. An acoustic communication system according to claim 16 wherein:

said transducer comprises a magnetostrictive transducer including a tubular magnetostrictive body of non-circular cross-section forming the body of said kelly.

18. An acoustic communication system according to claim 17 wherein:

said transducer includes field conductors to be energized by the incident acoustic waves;

a swivel rotatably connected to the upper end of said kelly for attachment to a hoist in said drilling platform;

an electrical cable extending from said swivel for connection to said receiving means; and rotary electrical contacts on said kelly and swivel electrically connecting said transducer conductors and cable.

19. An acoustic communication system according to claim 18 including:

means on said swivel for conducting drilling mud to a chamber within said swivel; and said kelly having a central mud passage extending through said transducer body and communicating said chamber to the mud passage in said drill string.

20. An acoustic communication system according to claim 9 wherein:

said pipe is a drill string suspended within a well bore from a drilling platform; and said means for establishing said acoustic waves comprises an electroacoustic transducer having a tubular body coupled in and forming a section of said drill string.

21. An acoustic communication system according to claim 20 wherein:

said transducer body has a central mud passage forming a section of the drill string mud passage.

22. A method of communicating information between signal-transmitting and signal-receiving stations spaced along a drill pipe having a drill bit at the lower end thereof and having an intervening length between said stations capable of sustaining zero order torsional acoustic waves, said method comprising the steps of:

generating an information signal representing and containing said information, and which is other than the acoustic vibration that occurs naturally in the drill pipe due to grinding of the drill bit on the hole bottom during the drilling operation;

establishing in said drill pipe zero order torsional acoustic waves which represent said information signal and contain the information to be transmitted and which travel from said transmitting station to said receiving station through said intervening pipe length; and receiving said waves at said receiving station and recovering therefrom said information signal and its contained information.

23. A communication system for communicating information between signal-transmitting and signal-receiving stations spaced along a drill pipe having a drill bit at the lower end thereof and having an intervening length between said stations capable of sustaining zero order torsional acoustic waves, said system comprising:

means for generating an information signal representing and containing said information, and which is other than the acoustic vibration that occurs naturally in the drill pipe due to grinding of the drill bit on the hole bottom during the drilling operation;

means for establishing in said pipe zero order torsional acoustic waves which represent said signal and contain the information to be transmitted and which travel from said transmitting station to said receiving station through said intervening pipe length; and receiving means at said receiving station for receiving said waves and recovering therefrom said signal and its contained information.

* * * * *